(12) United States Patent
Viguier et al.

(10) Patent No.: US 12,231,073 B2
(45) Date of Patent: Feb. 18, 2025

(54) PROPULSION CHANNEL FOR AIRCRAFT

(71) Applicant: SAFRAN, Paris (FR)

(72) Inventors: Christophe Ludovic Jean-Claude Viguier, Moissy-Cramayel (FR); Stéphane Petibon, Moissy-Cramayel (FR); Florent Rougier, Moissy-Cramayel (FR)

(73) Assignee: SAFRAN, Paris (FR)

( * ) Notice: Subject to any disclaimer, the term of this patent is extended or adjusted under 35 U.S.C. 154(b) by 118 days.

(21) Appl. No.: 17/996,306

(22) PCT Filed: Apr. 8, 2021

(86) PCT No.: PCT/FR2021/050621
§ 371 (c)(1),
(2) Date: Oct. 14, 2022

(87) PCT Pub. No.: WO2021/209701
PCT Pub. Date: Oct. 21, 2021

(65) Prior Publication Data
US 2023/0246573 A1    Aug. 3, 2023

(30) Foreign Application Priority Data
Apr. 15, 2020   (FR) ..................... 2003777

(51) Int. Cl.
*H02P 7/343* (2016.01)
*B60L 50/15* (2019.01)
(Continued)

(52) U.S. Cl.
CPC .............. *H02P 7/343* (2013.01); *B60L 50/15* (2019.02); *B60L 53/24* (2019.02); *B64D 27/24* (2013.01);
(Continued)

(58) Field of Classification Search
CPC .. H02P 7/343; H02P 2101/25; H02P 2101/30; H02P 2103/10; H02P 2207/05;
(Continued)

(56) References Cited

U.S. PATENT DOCUMENTS

2018/0037332 A1* 2/2018 Hughes ................. B64F 5/00
2018/0309318 A1* 10/2018 Dharmadhikari ....... H02P 9/007
(Continued)

FOREIGN PATENT DOCUMENTS

CA    2722335 A1 * 11/2011 ............. H02J 3/381
EP    3 103 671 A1    12/2016
(Continued)

OTHER PUBLICATIONS

France Search Report and Written Opinion mailed Nov. 16, 2020, issued in Application No. FR2003777, filed Apr. 15, 2020, 9 pages.
(Continued)

*Primary Examiner* — Bickey Dhakal
(74) *Attorney, Agent, or Firm* — CHRISTENSEN O'CONNOR JOHNSON KINDNESS PLLC

(57) ABSTRACT

A propulsion channel for aircraft at least one first dual-fed polyphase asynchronous rotating electric machine configured to be mechanically coupled to a turbine engine. The propulsion channel further includes at least one second polyphase rotating electric machine electrically coupled to the first asynchronous rotating electric machine, and a control and storage module configured to control the first polyphase asynchronous rotating electric machine. The module is connected to the first dual-feed polyphase asynchronous rotating electric machine as well as to the at least second polyphase rotating electric machine. The at least second polyphase rotating electric machine includes a polyphase synchronous rotating electric machine with permanent magnet.

10 Claims, 5 Drawing Sheets

(51) Int. Cl.
  *B60L 53/24* (2019.01)
  *B64D 27/24* (2006.01)
  *H02P 101/25* (2016.01)
  *H02P 101/30* (2015.01)
  *H02P 103/10* (2016.01)

(52) U.S. Cl.
  CPC ....... *B60L 2200/10* (2013.01); *B60L 2220/42* (2013.01); *H02P 2101/25* (2015.01); *H02P 2101/30* (2015.01); *H02P 2103/10* (2015.01); *H02P 2207/05* (2013.01)

(58) Field of Classification Search
  CPC ...... B60L 50/15; B60L 53/24; B60L 2220/42; B64D 27/24
  See application file for complete search history.

(56) References Cited

U.S. PATENT DOCUMENTS

| | | | | |
|---|---|---|---|---|
| 2021/0380263 | A1* | 12/2021 | Zhang | B60L 50/50 |
| 2024/0034479 | A1* | 2/2024 | Detweiler | B60L 3/0046 |

FOREIGN PATENT DOCUMENTS

| | | | |
|---|---|---|---|
| EP | 3 240 183 A1 | 11/2017 | |
| EP | 3 296 212 A1 | 3/2018 | |
| WO | 2017/137537 A1 | 8/2017 | |
| WO | 2018/027017 A1 | 2/2018 | |

OTHER PUBLICATIONS

International Search Report mailed Jul. 6, 2021, issued in corresponding International Application No. PCT/FR2021/050621, filed Apr. 8, 2021, 7 pages.

Written Opinion mailed Jul. 6, 2021, issued in corresponding International Application No. PCT/FR2021/050621, filed Apr. 8, 2021, 6 pages.

Khatounian et al., "Control of a Doubly Fed Induction Generator for Aircraft Application," The 29th Annual Conference of the IEEE Industrial Electronics Society, Nov. 2, 2003, pp. 2711-2716, vol. 3, IEEE.

Sadey et al., "Proposal and Development of a High Voltage Variable Frequency Alternating Current Power System for Hybrid Electric Aircraft," 14th International Energy Conversion Engineering Conference, Jul. 25, 2016, pp. 1-10, American Institute of Aeronautics and Astronautics.

Zhang et al., "Large electric machines for aircraft electric propulsion," IET Electric Power Applications, Jul. 1, 2018, pp. 767-779, vol. 12, No. 6, The Institution of Engineering and Technology.

English translation of Written Opinion mailed Jul. 6, 2021, issued in corresponding International Application No. PCT/FR2021/050621, filed Apr. 8, 2021, 5 pages.

International Preliminary Report on Patentability mailed Oct. 13, 2022, issued in corresponding International Application No. PCT/FR2021/050621, filed Apr. 8, 2021, 7 pages.

* cited by examiner

PROPULSION CHANNEL FOR AIRCRAFT

FIELD OF THE DISCLOSURE

The disclosure relates to aircraft propulsion systems, and more particularly to a hybrid propulsion channel for an aircraft, and more particularly relates to the electrification of propulsion, which aims to provide all or part of the propulsion by electric propellers in order to reduce emissions produced and noise pollution.

In a hybrid propulsion aircraft, the propulsion channel includes a turbomachine, which constitutes a mechanical power source, an electric generator mechanically coupled to the turbomachine and delivering an alternating voltage, and an electric motor electrically connected to the electric generator and mechanically coupled to a thruster, for example a propeller, generating thrust.

BACKGROUND

Typically, aircraft are propelled by turbomachines of the turboprop, turbojet or turbine type.

However, the use of turbomachines is accompanied by high noise emissions and high consumption of fossil fuels, especially kerosine, which also results in high polluting emissions.

In order to reduce pollutant and noise emissions, aircraft propulsion can be hybridized, especially by coupling turbomachines with electric motors driving propulsion propellers, to decrease pollutant and noise emissions during some phases, especially aircraft taxiing phases.

Such aircraft conventionally include at least one propulsion channel generally including an electric generator and an electric propulsion machine fed by the generator, the electric propulsion machine driving a propulsion propeller.

The electric generator is usually driven by a turbomachine.

Reference may be made to document US2016/0365810 which discloses a synchronous propulsion channel comprising a permanent magnet synchronous electric generator driven by a gas turbine, the generator directly feeding a permanent magnet synchronous electric motor connected to a propeller to propel the aircraft.

However, as the generator is directly connected to the engine, and is in direct engagement with the gas turbine, the speed variation of the electric propulsion motor is dictated by the rate of the gas turbine.

Document US2017/0170763 also discloses a synchronous propulsion channel which comprises a rotor flux controlled synchronous electric generator driven by a gas turbine, the generator directly feeding a permanent magnet synchronous electric motor connected to a propeller to propel the aircraft.

The speed variation of the electric propulsion motor is also dictated by the rate of the gas turbine.

In addition, the use of a synchronous propulsion channel requires synchronization and pull-in of the motor with the synchronous generator in order to operate, which requires control systems that are complex to implement.

Furthermore, as the synchronous electric generator is not magnetized by a control circuit, as long as it is driven, even in the event of a fault, it produces electric power that can deteriorate or even destroy the aircraft.

Document NASA-20170000886 discloses an asynchronous propulsion channel comprising a Doubly-Fed Induction Generator (DFIG) driven by a turbomachine and directly feeding a Doubly-Fed Induction Motor (DFIM) driving a propulsion propeller.

The asynchronous propulsion channel makes it possible to vary the rotational speed of the propeller independently of the rate of the turbomachine. However, it requires the implementation of several power control circuits for magnetizing and controlling the generator and the doubly-fed induction motor, increasing the overall mass of the propulsion channel and requiring communication between the control circuits to regulate efficient operating points.

In addition, the use of an asynchronous generator and motor and their control circuits severely degrades the overall energy efficiency of the propulsion channel.

The purpose of the disclosure is to overcome all or part of these drawbacks.

SUMMARY

In view of the foregoing, one object of the disclosure is a propulsion channel for aircraft comprising
  at least a first doubly-fed polyphase asynchronous rotating electric machine to be mechanically coupled to a turbomachine,
  at least a second polyphase rotating electric machine electrically coupled to the first asynchronous rotating electric machine, and
  a pilot and storage module configured to pilot the first polyphase asynchronous rotating electric machine
the module being connected, on the one hand, to the first doubly-fed polyphase asynchronous rotating electric machine and, on the other hand, to the at least second polyphase rotating electric machine, the at least second polyphase rotating electric machine comprising a permanent magnet polyphase synchronous rotating electric machine.

The use of the synchronous rotating electric machine enables minimization of the on-board mass in the aircraft by eliminating the power control circuit dedicated to the control of the synchronous machine, and enables increase in the energy efficiency of the propulsion channel.

According to one characteristic, the doubly-fed polyphase asynchronous rotating electric machine is of the brushless type.

According to another characteristic, the propulsion channel further comprises a switch connected between the at least second electric machine and a connection point connecting the first rotating electric machine and the module, the pilot and storage module being further configured to pilot the first synchronous rotating electric machine.

Preferably, the pilot and storage module comprises a first reversible electric power converter configured to pilot the first asynchronous rotating electric machine, a second reversible electric power converter connected to the first power converter and the connection point, the second reversible converter being configured to feed the first asynchronous rotating electric machine and the synchronous machine, the module further comprising an electric energy storage unit connected between the first electric power converter and the second electric power converter, the module being further configured to store electric energy in the storage unit.

According to yet another characteristic, the first and second reversible electric power converters are configured to transfer 30% of the rated power generated by the doubly-fed polyphase asynchronous rotating electric machine.

Advantageously, the second reversible electric power converter is further configured to transfer electric power generated by the permanent magnet polyphase synchronous rotating electric machine to the storage unit.

According to a further characteristic, the propulsion channel further comprises a second permanent magnet synchronous rotating electric machine mechanically connected between the turbomachine and the first doubly-fed polyphase asynchronous rotating electric machine, the pilot and storage module further comprising a third electric power converter connected to the second synchronous rotating electric machine and to the electric energy storage unit, the third electric power converter being configured to transfer electric power generated by the second synchronous electric machine to the storage unit and the first power converter.

Advantageously, the propulsion channel further comprises a third permanent magnet polyphase synchronous rotating electric machine and a fourth reversible electric power converter connected to the third synchronous rotating electric machine and connected between the first electric power converter and the second electric power converter.

Also provided is an aircraft comprising a propulsion channel as previously defined, and a turbomachine configured to drive the first polyphase asynchronous rotating electric machine.

Preferably, the aircraft further comprises a second propulsion channel of identical architecture to the propulsion channel, the turbomachine being configured to drive the propulsion channels.

DESCRIPTION OF THE DRAWINGS

Further purposes, characteristics and advantages of the disclosure will become apparent upon reading the following description, which is given by way of non-limiting example only, and made with reference to the appended drawings in which.

DETAILED DESCRIPTION

Figure 1:
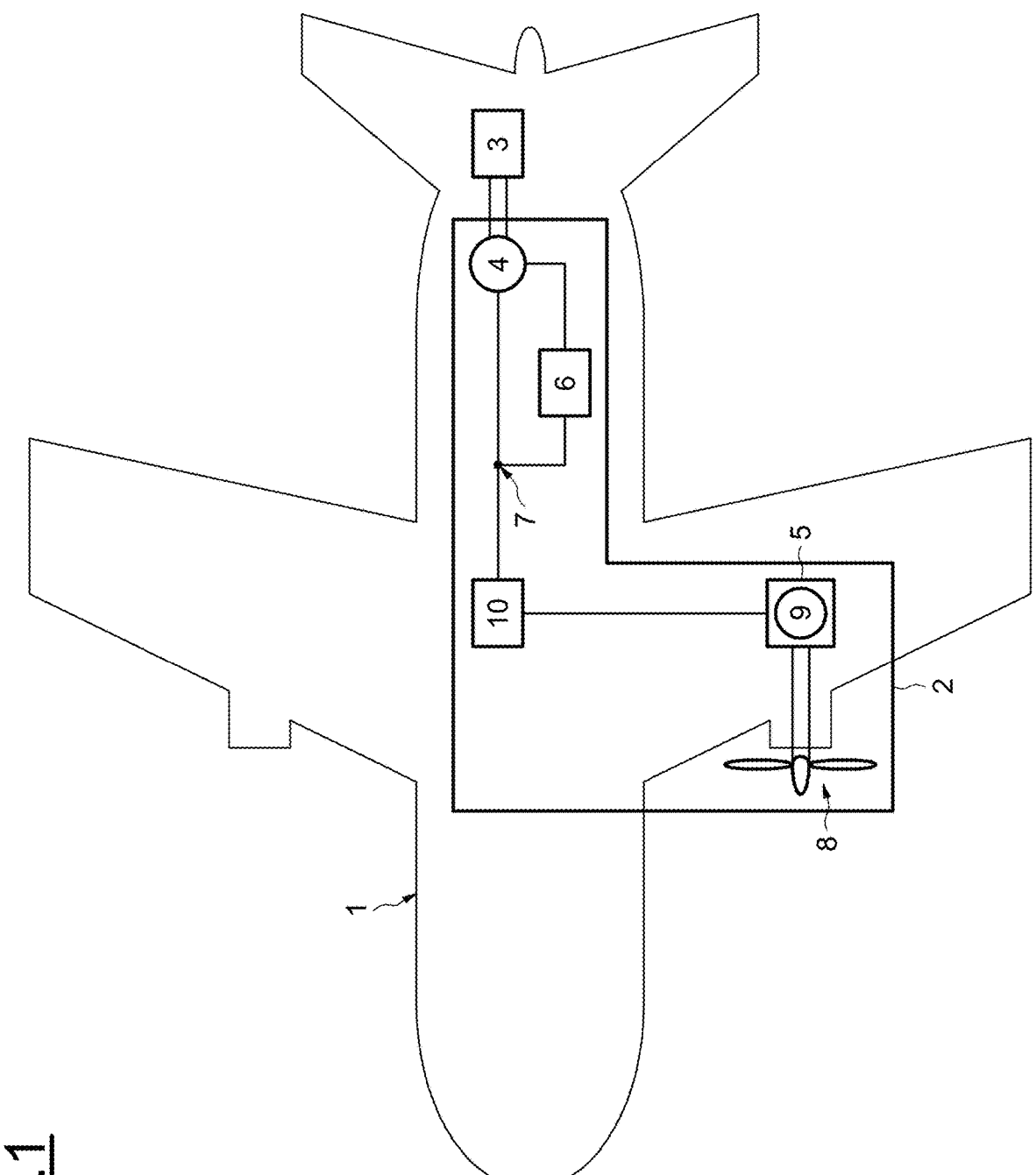
FIG. 1 is a schematic view of an aircraft comprising a propulsion channel in accordance with the disclosure.

Reference is made to FIG. 1 which schematically illustrates an aircraft 1 comprising a first embodiment of a propulsion channel 2 in accordance with the disclosure. The aircraft further comprises a turbomachine 3, for example of the turboprop, turbojet or turbine type, driving the propulsion channel to propel the aircraft.

The aircraft 1 may be of the vertical take-off and landing (VTOL), short take-off and landing (STOL) or conventional take-off and landing (CTOL) type.

In the example illustrated, the aircraft 1 includes a single propulsion channel 2 for propelling the aircraft 1 and comprising rotating electric machines for generating electric power and propelling the aircraft 1 from the produced electric power.

Alternatively, the aircraft may comprise several propulsion channels for propelling the aircraft 1.

The propulsion channel 2 comprises a first and a second rotating electric machine 4 and 5. The first rotating electric machine 4 is a doubly-fed polyphase asynchronous electric machine mechanically coupled to the turbomachine 3, and the second rotating electric machine 5 is a polyphase electric machine electrically coupled to the first asynchronous rotating electric machine 4 and includes a shaft coupled to a propulsion propeller 8.

The propulsion channel 2 further includes a pilot and storage module 6 piloting the polyphase asynchronous rotating electric machine and storing electric energy.

The first rotating electric machine 4 may be of the brushless type comprising a wound or squirrel-cage rotor.

The stator 21 of the first asynchronous rotating electric machine 4 comprises a first stator winding 22 generating the electric power feeding the second rotating electric machine 5 and a second distinct stator winding 23 connected to the module 6 for magnetizing and piloting the magnetic flux of the rotor 24 so as to control frequency and amplitude of the electric power signal from the electric machines.

The pilot and storage module 6 is connected, on the one hand, to the first asynchronous rotating electric machine 4 and, on the other hand, to a connection point 7 located between the first electric machine 4 and the second polyphase rotating electric machine 5.

The module 6 comprises power converters and its architecture will be detailed in the following.

The second rotating electric machine 5 comprises a first permanent magnet polyphase synchronous rotating electric machine 9.

Alternatively, several permanent magnet polyphase synchronous rotating electric machines 9 may be connected to the connection point 7 so as to be fed by the first asynchronous rotating electric machine 4, each synchronous rotating electric machine 9 being coupled to its own propeller 8.

The first channel 2 may further comprise a switch 10 connecting the first synchronous rotating electric machine 9 to the connection point 7.

When the switch 10 is open, the module 6 pilots and feeds the first machine 4 especially to start the turbomachine 3.

Piloting the rotor flux of the first asynchronous rotating electric machine 4 by means of the pilot and storage module 6 makes it possible to vary the frequency and the amplitude of the electric power signal feeding the first synchronous rotating electric machine 9 so as to control thrust generated by the propeller 8 independently of the rate of the turbomachine 3.

For example, the module 6 pilots the rotor flux of the first asynchronous rotating electric machine 4 so that the variation in the frequency of the power signal is within a range of variation of, for example, more or less 30% centered on the rated performance point of the first asynchronous rotating electric machine 4. The power converters are dimensioned to transfer 30% of the rated power, thus reducing their masses.

Such a type of piloting makes it possible, in particular, to operate the first asynchronous machine 4 at its optimum operating point according especially to the rate of the turbomachine 3, and especially to vary the rotational speed of the first synchronous machine 9.

The use of the first synchronous rotating electric machine 9 enables minimization of the on-board mass in the aircraft by eliminating the power control circuit dedicated to the control of the first synchronous machine 9, and enables increase in the energy efficiency of the propulsion channel.

The thrust of the propeller 8 can be controlled within the range of variation.

In addition, to generate the electric power, the first asynchronous machine 4 requires to be magnetized by the module 6. Therefore, it is possible to control de-excitation of the machine and to manage fault modes of the first channel 2 to limit propagation of faults so as to prevent deterioration of the aircraft 1.

Figure 2:
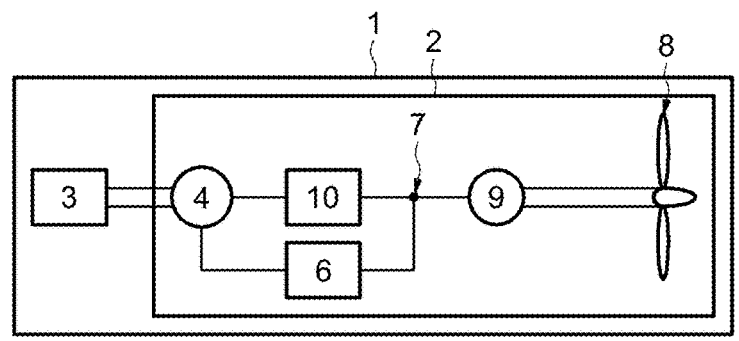
FIG. 2 illustrates a second embodiment of a propulsion channel according to the disclosure.

FIG. 2 illustrates a second embodiment of a propulsion channel 2 in accordance with the disclosure. In this figure, elements identical to those in FIG. 1 are designated by the same reference numeral.

This embodiment differs from the first embodiment illustrated in FIG. 1 in that the switch 10 is disposed between the first asynchronous machine 4 and the connection point 7.

The switch 10 enables the first synchronous rotating electric machine 9 to be disconnected from the first asynchronous machine 4 so that the first synchronous rotating electric machine 9 is fed by the module 6, allowing, for example, taxiing of the aircraft 1 without combustion gas emissions and without noise emissions.

Figure 3:
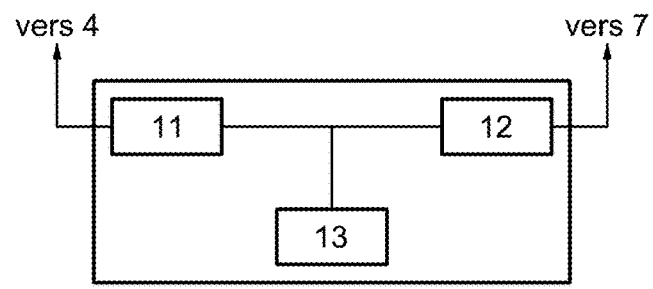
FIG. 3 illustrates an embodiment of a pilot and storage module.

FIG. 3 illustrates an example of an embodiment of the pilot and storage module 6.

The storage module 6 comprises a first reversible electric power converter 11, a second reversible electric power converter 12 connected to the first converter 11 and to the connection point 7 and an electric energy storage unit 13 connected between the first converter 11 and the second converter 12.

The first converter 11 feeds the second winding of the first asynchronous rotating electric machine 4 and is of the inverter type made, for example, from power transistors.

The second converter 12 feeds the first winding of the first asynchronous rotating electric machine 4 or the first synchronous machine 9, and is of the inverter type, made for example from power transistors.

The storage unit 13 is for example of the battery or supercapacitor type.

Figure 4:
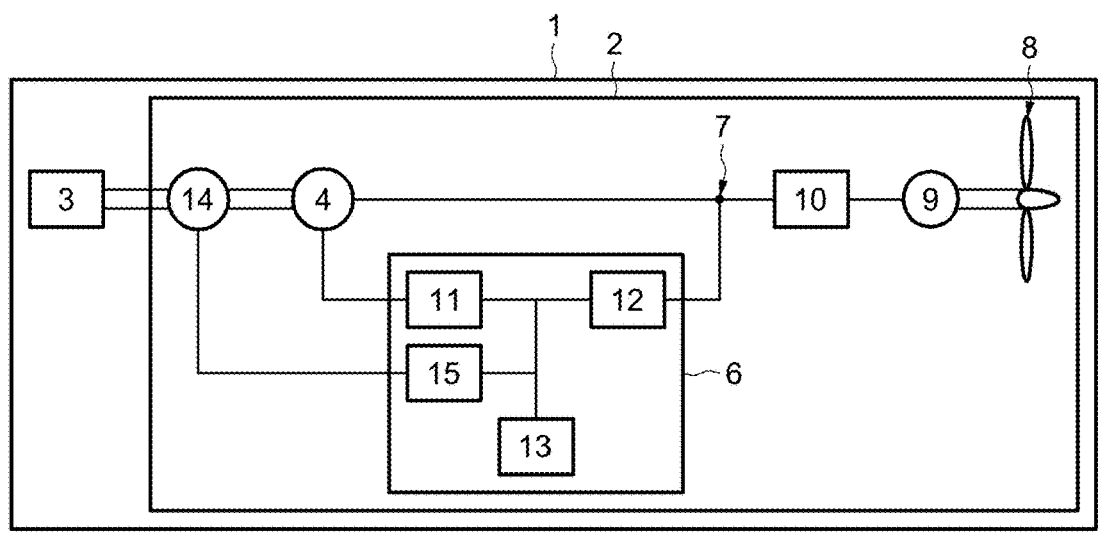
FIG. 4 illustrates a third embodiment of the propulsion channel.

Reference is made to FIG. 4 which illustrates a third embodiment of the propulsion channel 2.

This embodiment differs from the embodiments illustrated in FIGS. 1 to 3 in that the propulsion channel 2 further comprises a second permanent magnet synchronous rotating electric machine 14 mechanically connected between the turbomachine 3 and the first asynchronous rotating electric machine 4, and a third electric power converter 15 connected to the second synchronous rotating electric machine 14 and to the storage unit 13.

The third converter 15 transfers, for example, electric power generated by the second synchronous electric machine 14 to the storage unit 13 and the first converter 11.

The second synchronous rotating electric machine 14 generates additional electric power for magnetizing the first machine 4 via the first converter 11, or for recharging the storage unit 13.

Alternatively, this electric power can also be used to feed power distribution circuits of the aircraft 1.

Figure 5:
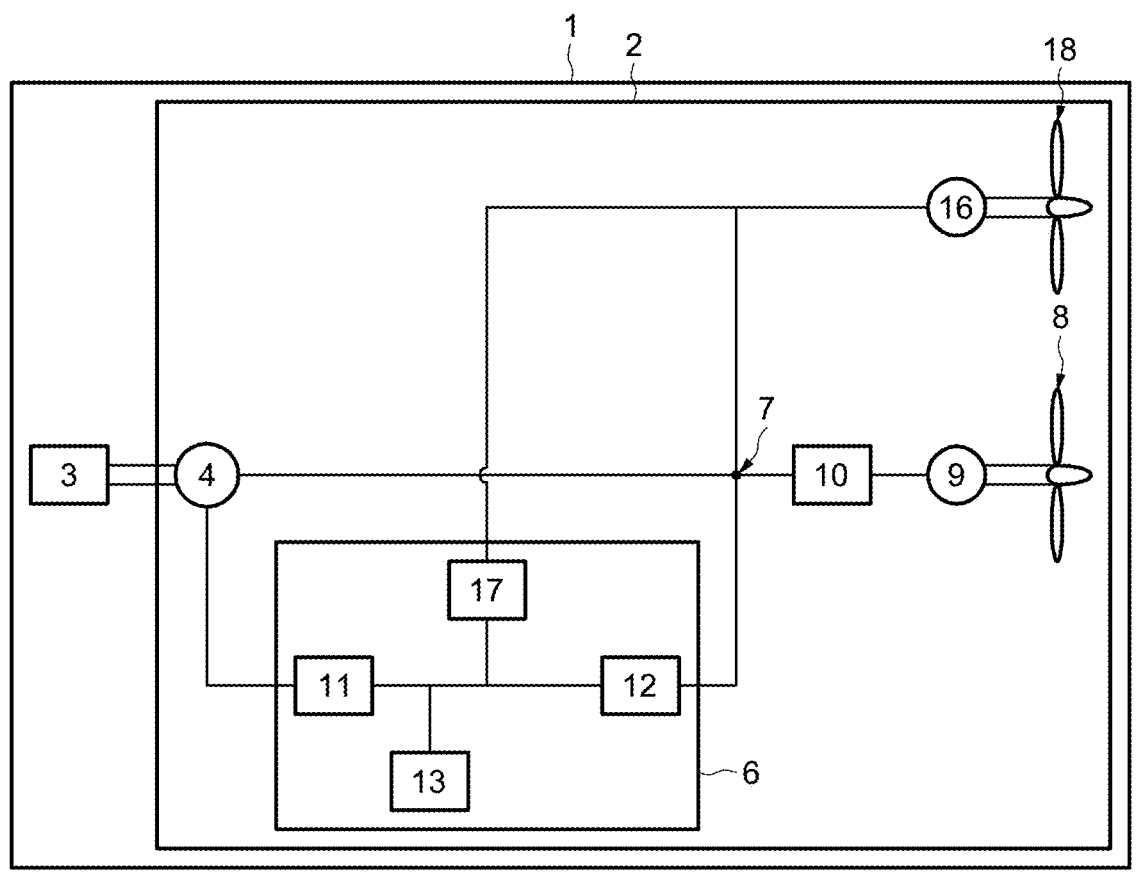
FIG. 5 illustrates a fourth embodiment of the propulsion channel.

FIG. 5 illustrates a fourth embodiment of the propulsion channel 2.

This embodiment differs from the embodiment illustrated in FIG. 2 in that the channel 2 further comprises a third permanent magnet polyphase synchronous rotating electric machine 16 and a fourth reversible electric power converter 17 connected to the third synchronous rotating electric machine 16, and connected between the first converter 11 and the second converter 12.

The third synchronous electric machine 16 comprises a shaft coupled to a second propeller 18

The fourth converter 17 is identical in architecture to the second converter 12.

The first synchronous electric machine 9 and the third synchronous electric machine 16 can be piloted independently of each other, allowing sequential start of the two machines 9 and 16, especially to reduce the peaks in electric power demand during the start phases of the synchronous machines 9 and 16.

Furthermore, such an arrangement of the first and second synchronous electric machines makes it possible to create a speed differential, and consequently a thrust differential, to contribute to the control of the altitude of the aircraft 1 if, for example, the first and second electric machines are placed respectively on either side of the longitudinal axis of symmetry of the aircraft 1.

Alternatively, the channel 2 may comprise more than two permanent magnet synchronous electric machines each connected to the module 6 via a reversible power converter.

Figure 6:
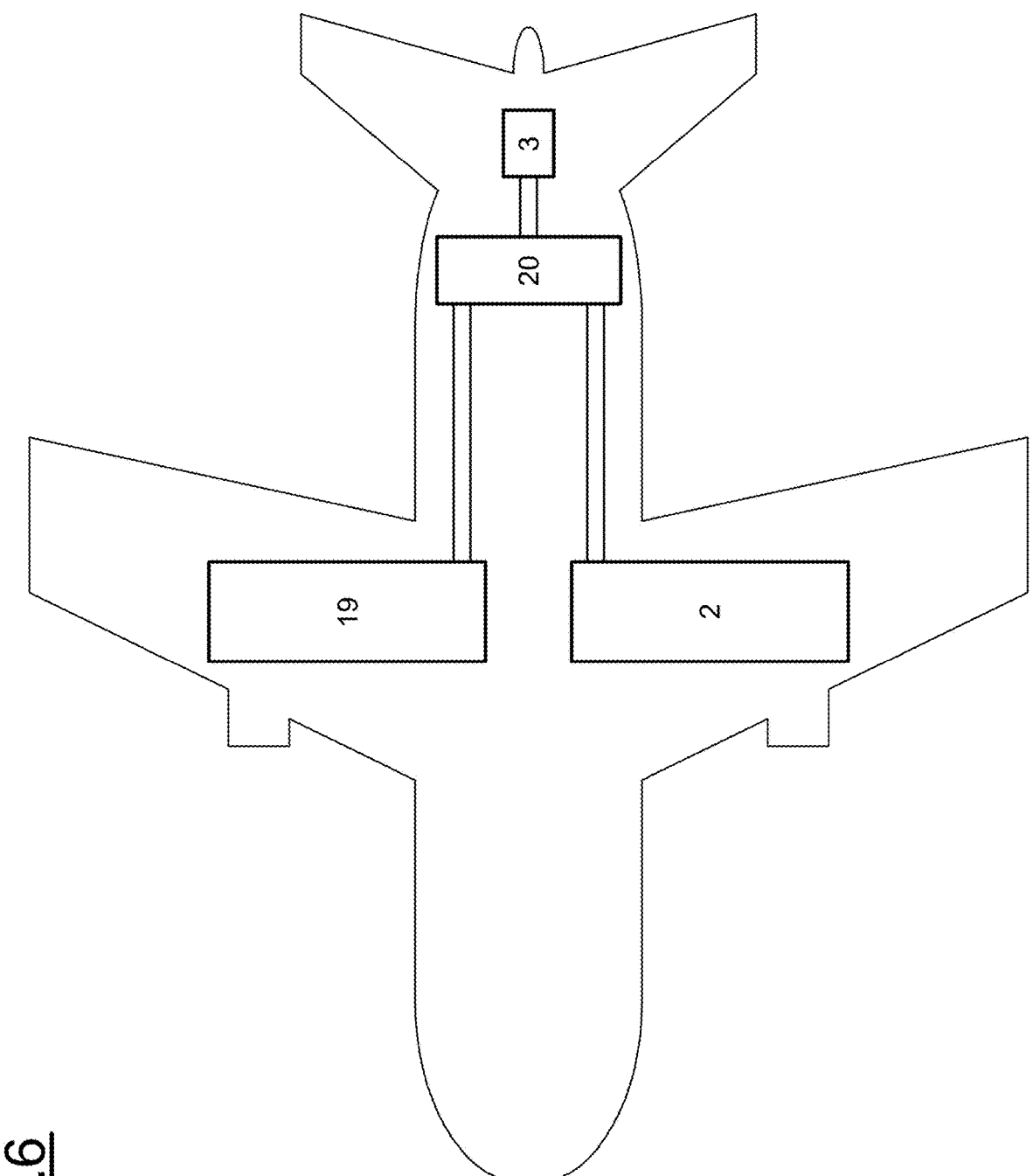
FIG. 6 illustrates an embodiment of an aircraft propulsion system with two propulsion channels.

FIG. 6 illustrates another implementation of an aircraft propulsion system, comprising, in addition to the turbomachine 3, the first propulsion channel 2 described above, a second propulsion channel 19 of identical architecture to the first propulsion channel 2, and a mechanical power transfer system 20.

Both propulsion channels 2, 19 are driven by the turbomachine 3 via the mechanical power transfer system 20.

Figure 7:
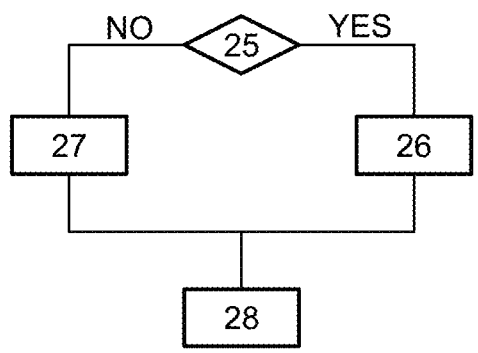
FIG. 7 illustrates an example of starting the propulsion channel.
Figure 8:
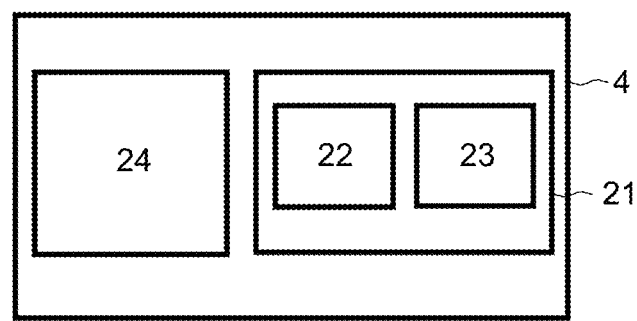
FIG. 8 illustrates an example of a rotating electric machine used in the propulsion channel shown in FIG. 1.

FIG. 7 illustrates an example of implementation of a start phase of the propulsion channel 2.

If the turbomachine 3 is switched off (step 25), the first converter 11 feeds the second winding of the first asynchronous rotating electric machine 4 from the storage unit 13, and the second converter 12 feeds the first winding assembly of the first asynchronous rotating electric machine 4 from the storage unit 13 (step 27). The first asynchronous rotating electric machine 4 is piloted in motor mode.

The first asynchronous machine 4 mechanically drives the turbomachine 3 until it is started and operated autonomously.

When the turbomachine 3 is operating autonomously, the first asynchronous rotating electric machine 4 is piloted in generator mode.

Alternatively, the asynchronous generator 4 may be de-excited and decoupled from any power feed so as not to generate power to the propulsion channel.

If the turbomachine 3 is operating (step 25), the first converter 11 feeds the second winding of the first asynchronous rotating electric machine 4 from the storage unit 13 (step 26), and the second converter 12 feeds the first winding assembly. The first asynchronous rotating electric machine 4 is piloted in generator mode.

When the first asynchronous rotating electric machine 4 generates electric power, the starting method continues with step 28.

In the next step 28, the switch 10 disposed between the first synchronous rotating electric machine 9 and the connection point 7 (FIGS. 1 and 4) is closed. The first converter 11 pilots the second winding of the first asynchronous rotating electric machine 4 and the second converter 12 feeds the first winding assembly in such a way as to ensure synchronization and pull-in of the first synchronous electric machine 9 when starting the first synchronous electric machine 9 by regulating the amplitude and frequency of the generated polyphase voltage.

If the propulsion channel 2 comprises several synchronous electric machines, each converter connected to a synchronous electric machine is piloted to ensure synchronization and pull-in of the synchronous electric machine when starting the synchronous electric machine by regulating the magnitude and frequency of the generated polyphase voltage.

The first converter 11 and the second converter 12 pilot the first asynchronous rotating electric machine 4 so that, for example, the machine 4 generates the power signal in the form of a ramp promoting synchronization and pull-in of the first synchronous electric machine 9.

When the switch 10 is disposed between the first asynchronous machine 4 and the connection point 7 (FIGS. 2 and 5), in step 28 the switch 10 is open. The second converter 12 feeds the first synchronous electric machine 9 from the storage unit 13 and the first converter 11 pilots the second winding of the first asynchronous rotating electric machine 4 so as to synchronize the amplitude and frequency of the power signal with the voltage delivered by the second converter 12.

Then the switch 10 is closed, the first converter 11 piloting the second winding of the first asynchronous rotating electric machine 4 so as to pull in the first synchronous rotating electric machine 9 with the asynchronous rotating electric generator 4.

Taxiing the aircraft 1, by electric propulsion, is carried out by opening the switch 10 when the switch is disposed between the first asynchronous machine 4 and the connection point 7 (FIGS. 2 and 5) or by closing the switch 10 when the switch is disposed between the connection point 7 and the first synchronous rotating electric machine 9 (FIGS. 1 and 4).

The second converter 12 then supplies the first synchronous electric machine 9 from the storage unit 13, the first converter 11 not being active.

The speed of the aircraft 1 on the ground can be regulated by varying the frequency of the feed signal from the converter 12.

Taxiing the aircraft is thus carried out by electric propulsion so that combustion gas emissions are eliminated, and noise emissions are reduced.

When the aircraft 1 is in a steady flight phase (for example take-off, cruise), the variation in the rotational speed of the first synchronous electric machine 9 makes it possible to regulate the thrust of the propeller 8 independently of the rotational speed of the turbomachine 3 via the control of the frequency generated by the asynchronous rotating electric machine 4.

The turbomachine can thus be operated at its optimum operating point, and its efficiency can be improved.

In addition, the decorrelation between the rotational speed of the turbomachine 3 and the propeller 8 allows the turbomachine 3 to be operated at high rate and thus increase its efficiency.

When the aircraft 1 is in a transient flight phase, for example during altitude changes, the thrust variation can be generated by the control of the first asynchronous machine 4 independently of the rate of the turbomachine 3.

In addition, if the propeller 8 is not used to produce thrust, the free autorotation due to the forward motion of the aircraft 1 allows the first synchronous electric machine 9 to be rotatably driven.

The first synchronous electric machine 9 thus operates in generator mode to, for example, feed power distribution circuits of the aircraft 1 or to recharge the storage unit 13 via the second converter 12.

The invention claimed is:

1. A propulsion channel for an aircraft comprising:
at least a first doubly-fed polyphase asynchronous rotating electric machine configured to be mechanically coupled to a turbomachine,
at least a second polyphase rotating electric machine electrically coupled to the first asynchronous rotating electric machine, and
a pilot and storage module configured to pilot the first doubly-fed polyphase asynchronous rotating electric machine,
said module being connected to the first doubly-fed polyphase asynchronous rotating electric machine and to said at least second polyphase rotating electric machine, said at least second polyphase rotating electric machine comprising a permanent magnet polyphase synchronous rotating electric machine,
wherein a stator of the first doubly-fed polyphase asynchronous rotating electric machine comprises a first stator winding generating the electric power feeding the second polyphase rotating electric machine and a second stator winding connected to the pilot and storage module for magnetizing and piloting the magnetic flux of a rotor of the first doubly-fed polyphase asynchronous rotating electric machine so as to control frequency and amplitude of the electric power signal from the first electric machine.

2. The channel according to claim 1, wherein the doubly-fed polyphase asynchronous rotating electric machine is of the brushless type.

3. The channel according to claim 1, further comprising a switch connected between said at least second polyphase rotating electric machine and a connection point connecting said first doubly-fed polyphase asynchronous electric machine and the module, the pilot and storage module being further configured to pilot the first permanent magnet polyphase synchronous rotating electric machine.

4. The channel according to claim 1, wherein the pilot and storage module comprises a first reversible electric power converter configured to pilot said first doubly-fed polyphase asynchronous rotating electric machine, a second reversible electric power converter being connected to the first power converter and to the connection point, the second converter being configured to feed the first doubly-fed polyphase asynchronous rotating electric machine and the permanent magnet polyphase synchronous rotating electric machine, said module further comprising an electric energy storage unit connected between the first electric power converter and the second electric power converter, the module being further configured to store electric energy in the storage unit.

5. The channel according to claim 4, wherein the first and second reversible electric power converters are configured to transfer 30% of the rated power generated by the doubly-fed polyphase asynchronous rotating electric machine.

6. The channel according to claim 4, wherein the second reversible electric power converter is further configured to transfer electric power generated by the permanent magnet polyphase synchronous rotating electric machine to the storage unit.

7. The channel according to claim 4, further comprising a second permanent magnet synchronous rotating electric machine mechanically connected between the turbomachine and the first doubly-fed polyphase asynchronous rotating electric machine, the pilot and storage module further comprising a third electric power converter connected to the second permanent magnet synchronous rotating electric machine and to the electric energy storage unit, the third electric power converter being configured to transfer electric power generated by the second permanent magnet synchronous electric machine to the storage unit and the first power converter.

8. The channel according to claim 7, further comprising a third permanent magnet polyphase synchronous rotating electric machine and a fourth reversible electric power converter connected to said third synchronous rotating electric machine and connected between the first electric power converter and the second electric power converter.

9. An aircraft comprising a first propulsion channel according to claim 1, and a turbomachine configured to drive the first doubly-fed polyphase asynchronous rotating electric machine.

10. The aircraft according to claim 9, further comprising a second propulsion channel of identical architecture to the first propulsion channel, the turbomachine being configured to drive the first and second propulsion channels.

* * * * *